(12) United States Patent
Rueb

(10) Patent No.: US 12,025,442 B2
(45) Date of Patent: Jul. 2, 2024

(54) CONTROL OF AN OPTICAL INDICATOR SYSTEM THROUGH MANIPULATION OF PHYSICAL OBJECTS

(71) Applicant: VIRTEK VISION INTERNATIONAL INC, Waterloo (CA)

(72) Inventor: Kurt D. Rueb, Kitchener (CA)

(73) Assignee: Virtek Vision International Inc., Waterloo (CA)

( * ) Notice: Subject to any disclaimer, the term of this patent is extended or adjusted under 35 U.S.C. 154(b) by 0 days.

(21) Appl. No.: 18/110,205

(22) Filed: Feb. 15, 2023

(65) Prior Publication Data

US 2023/0194259 A1 Jun. 22, 2023

Related U.S. Application Data

(63) Continuation-in-part of application No. 17/497,211, filed on Oct. 8, 2021, now Pat. No. 11,828,711.

(60) Provisional application No. 63/311,690, filed on Feb. 18, 2022, provisional application No. 63/089,866, filed on Oct. 9, 2020.

(51) Int. Cl.
*G01C 11/02* (2006.01)
*G01B 11/14* (2006.01)
*G03B 21/20* (2006.01)

(52) U.S. Cl.
CPC ............ *G01C 11/02* (2013.01); *G01B 11/14* (2013.01); *G03B 21/2033* (2013.01)

(58) Field of Classification Search
CPC ......... G01C 11/02; G01B 11/14; G01B 11/25; G03B 21/2033
See application file for complete search history.

(56) References Cited

U.S. PATENT DOCUMENTS

| | | | |
|---|---|---|---|
| 8,054,471 B2* | 11/2011 | Sciammarella | G01B 11/25 356/604 |
| 8,437,535 B2* | 5/2013 | Boca | G01S 17/875 382/154 |
| 8,937,725 B2* | 1/2015 | Novak | G01S 17/66 356/601 |
| 9,200,899 B2 | 12/2015 | Rueb | |
| 9,245,062 B2 | 1/2016 | Rueb | |
| 9,881,383 B2 | 1/2018 | Rueb | |
| 10,052,734 B2 | 8/2018 | Rueb | |
| 11,110,611 B2 | 9/2021 | Häusler | |

(Continued)

*Primary Examiner* — Hung V Nguyen
(74) *Attorney, Agent, or Firm* — Gregory D. DeGrazia; Miller, Canfield, Paddock and Stone

(57) ABSTRACT

A method and system for controlling projection of optical indicators on a worksurface is disclosed. A projection device for projecting a first optical indicator and a second optical indicator onto a worksurface is provided. A measurement system monitors a work area in which the worksurface is disposed. The measurement system locates a control object within the work area and identifies a marker disposed on the control object. The measurement system monitors a first disposition and a second disposition of the control object. The projection device projects the first optical indicator onto the worksurface and the projection device projects the second optical indicator onto the worksurface in response to manipulation of the control object between the first disposition and the second disposition as detected by said measurement system.

22 Claims, 4 Drawing Sheets

(56) References Cited

U.S. PATENT DOCUMENTS

| | | |
|---|---|---|
| 11,295,461 B2 | 4/2022 | Rueb |
| 11,481,915 B2 | 10/2022 | Dal Mutto et al. |
| 2021/0035169 A1 | 2/2021 | Bugovics |

* cited by examiner

CONTROL OF AN OPTICAL INDICATOR SYSTEM THROUGH MANIPULATION OF PHYSICAL OBJECTS

PRIOR APPLICATIONS

The present application claims priority as a Continuation-In-Part to U.S. patent application Ser. No. 17/497,211 filed on Oct. 8, 2021 that claims priority to U.S. Provisional Patent Application No. 63/089,866, filed Oct. 9, 2020 and claims priority to U.S. Provisional Patent Application No. 63/311,690 filed on Feb. 18, 2022, the contents of which are included in entirety herein by reference.

TECHNICAL FIELD

The present invention relates generally toward a method for displaying optical indicators using a light projector. More specifically, the present invention is directed toward providing an enhanced user interface that allows control over the optical indicators through manipulation of physical objects.

BACKGROUND

Optical indicators are projected onto worksurfaces to guide precise placement of parts and to locate features of interest in many manual assembly or manufacturing process tasks, such as placing precut carbon fiber sheets for assembling airplane components or inspecting and correcting defects in a part surface or finish. Typically, the optical indicator is displayed by projecting a laser beam off a pair of rotating galvanometer mirrors to trace a desired 3D pattern profile that functions as an assembly aid or template on a part surface. If traced with sufficient laser speed, the optical indicator will appear as a stable, flicker-free image to guide the assembly or manufacturing process task.

Traditionally, as is represented in FIG. 1, optical indicators such as laser scanned template patterns are generated by a laser projector 10. The laser projector 10 is registered to a worksurface 12 of a workpiece 14 by placing retro-reflective targets 16 at precisely measured locations on the worksurface 12. The retro-reflective targets 16 are scanned by mirrors of a scanning system included in the laser projector 10, and a 3D position and orientation of the projector 10 is calculated using a mathematical process generally referred to as resection. Once aligned, template patterns 17 defining various process steps or part features corresponding to the workpiece 14 are accurately projected directly on the worksurface 12 as shown in FIG. 2.

While this technique is suitable for certain applications, such as manufacturing composite airplane components, resources involved in mounting and accurately measuring target locations on parts or tools may be prohibitive for other applications. More rapid alignment, laser projection and operator feedback are necessary.

To overcome the limitations of traditional laser projection systems, camera-based photogrammetry has been integrated to allow direct measurement of a location on the part or tool surface relative to the projector. One such system that utilizes camera-based photogrammetry is described in U.S. Pat. No. 9,200,899, the contents of which are incorporated herein by reference. Referring to FIG. 2, a photogrammetry system 18 includes one or more cameras 20 typically electronically integrated with the laser projector 10 by way of a controller or processor. The photogrammetry system 18 measures a location of the workpiece 14 by detecting retro-reflective targets, measuring features or worksurfaces 12 of the workpiece 14, using a handheld probe 22, locating patterns projected by the laser projector 10, or combinations thereof. The alignment of the laser projector 11 relative to the photogrammetry system 18 within a common three-dimensional coordinate system is then determined enabling accurate projection of a laser template or other assembly aid.

This approach was further disclosed in U.S. Pat. No. 9,881,383, the contents of which are incorporated herein by reference, to monitor locations of objects in real-time with a photogrammetry system for matching a measured motion path of the objects while an optical template is scanned by a laser. This allows the optical template to be registered to an object surface so that when an operator picks up and manipulates the object to perform an assembly or inspection task, it appears as if the optical template is part of the surface of the object, thereby providing a high degree of usability for assembly or inspection tasks.

Navigating through an inspection or assembly task is performed by providing instructions to a host computer via a user interface. Given the effective nature of using an optical projection system in which an operator is typically in proximity to a projected image, returning to the host computer can become a dominant factor in timely completion of assembly and inspection tasks. Therefore, it is beneficial to signal the computer from a remote location. Use of a handheld remote-control device is possible but can be confusing if complicated selections are involved, such as providing multiple buttons on the remote-control device or requiring reuse of a smaller number of buttons. Further, the remote-control device can be lost, broken, or stolen.

To overcome these difficulties, laser projectors 10 such as those described in U.S. Pat. No. 5,957,559, the contents of which are incorporated herein by reference, projects control functions by detecting a retro-reflective patch to make various selections to control a projection process. As shown in FIG. 4, the laser projector 10 projects icon patterns 26-36 that represent different modes of displaying components in a pre-fabricated roof truss assembly. By placing the retro-reflective patch 24 in the path of the laser beam 38 from the laser projector 10, an operator 40 can make selections at a remote location, many feet from a host computer. Positioning the reflective patch within the laser beam above one of the icon patterns 26-36 signals the host computer by way of reflected laser beam 42.

However, projected menus of this type have known disadvantages. First, projecting the menu increases demand on the projection system reducing efficiency. The projected icon patterns 26-36 and other displayed patterns are displayed sequentially by a scan path of the laser beam 38, producing flicker if the path of the laser is too long as is required when projecting multiple icon patters 26-36 from which an operator is to select. Second, provisions are required to activate the menu, typically by creating special initiation features in a projected pattern at convenient intervals. Further, the menu is required to be projected onto a suitable surface (i.e., flat and at a suitable angle to the laser projector 10) to be clearly visible. Interactions generally fail if motion of the operator takes the retro-reflective patch 24 out of the laser beam 38 where it cannot be sensed (e.g., to drag a projected feature to a desired location).

None of these systems are useful for providing a full interface between an operator and the controller for signaling in real time a progression of work tasks. Therefore, it would be desirable to develop a projection system that empowers an operator to more fully control a progression of work tasks while being remote to the controller.

SUMMARY

A method and system for controlling projection of optical indicators on a worksurface is disclosed. A projection device for projecting a first optical indicator and a second optical indicator onto a worksurface is provided. A measurement system monitors a work area in which the worksurface is disposed. The measurement system locates a control object within the work area and identifies a marker disposed on the control object. The measurement system monitors a first disposition and a second disposition of the control object. The projection device projects the first optical indicator onto the worksurface and the projection device projects the second optical indicator onto the worksurface in response to manipulation of the control object between the first disposition and the second disposition as detected by said measurement system.

The method and system of the present invention provides an operator the ability to interface with a controller providing a controller real time feedback of implementation and completion of work tasks. The measurement system tracks movement of the control object to determine disposition of a work function on a worksurface. In one embodiment, the measurement system monitors types of movement of the control object indicative of implementation of a work function and subsequent completion of a work function. In an alternative embodiment, an operator is instructed to make predetermined movements to signal the measurement system various stages of a work function, i.e., beginning, progressing, completion, etc. In each instance, the measurement system signals a controller to modify projection of a laser image on the worksurface to direct the operator to the next work function. Work functions are contemplated to include, but are not limited to paint repairs, ply layups, machining, assembly, decail application and the like.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION

Figure 2:
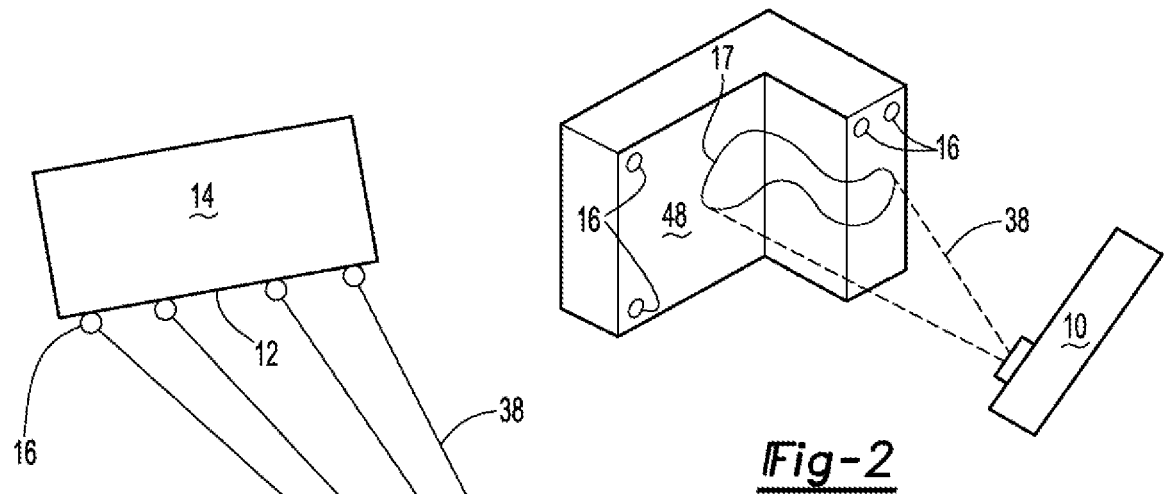
FIG. 2 shows a laser projector scanning a template on a worksurface of a workpiece after having registered the workpiece relative to the laser projector.
Figure 1:
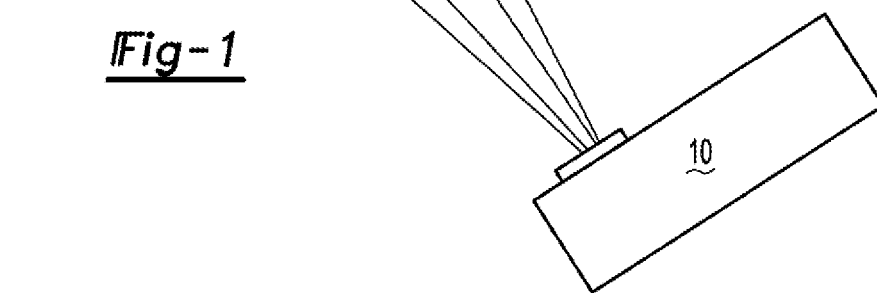
FIG. 1 shows a laser projector scanning reflective targets affixed to a workpiece.
Figure 3:
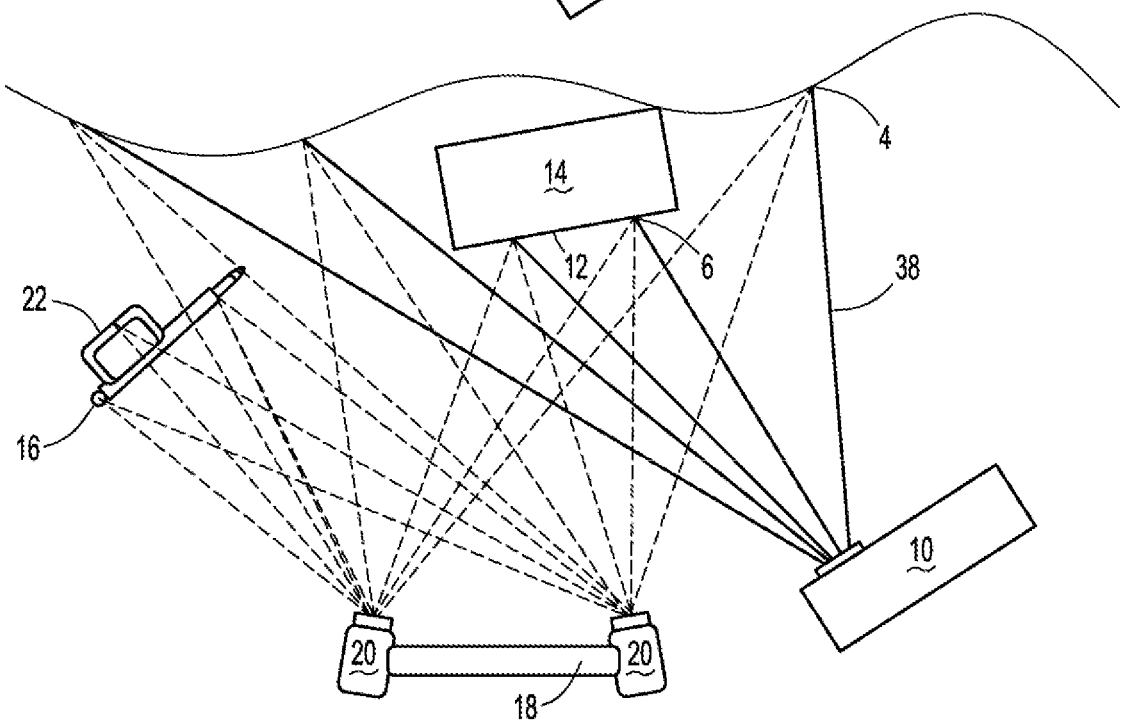
FIG. 3 shows a laser projection system in combination with a photogrammetry system used to register the laser projector relative to a workpiece.
Figure 4:
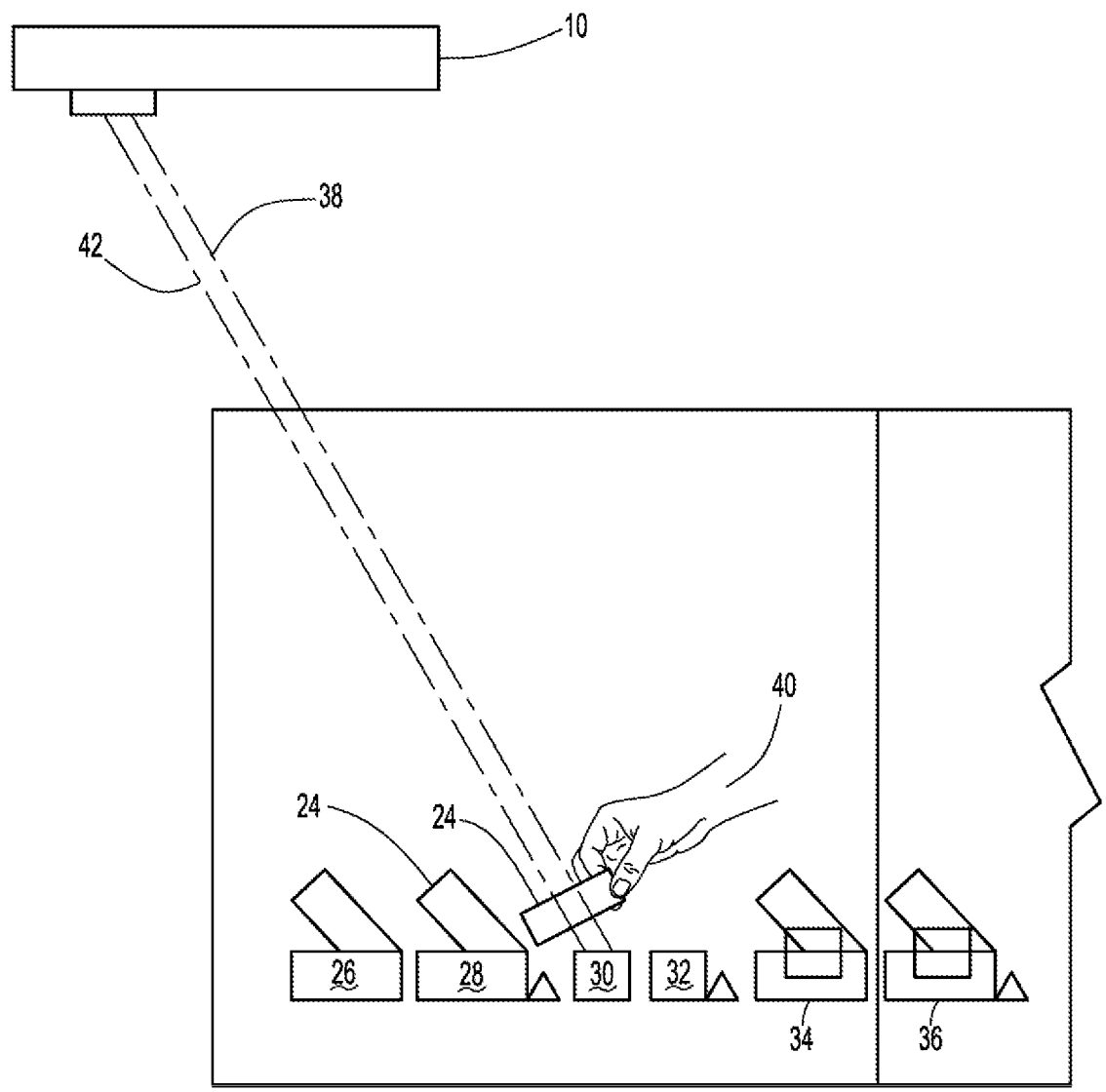
FIG. 4 shows the prior art icon system.
Figure 5:
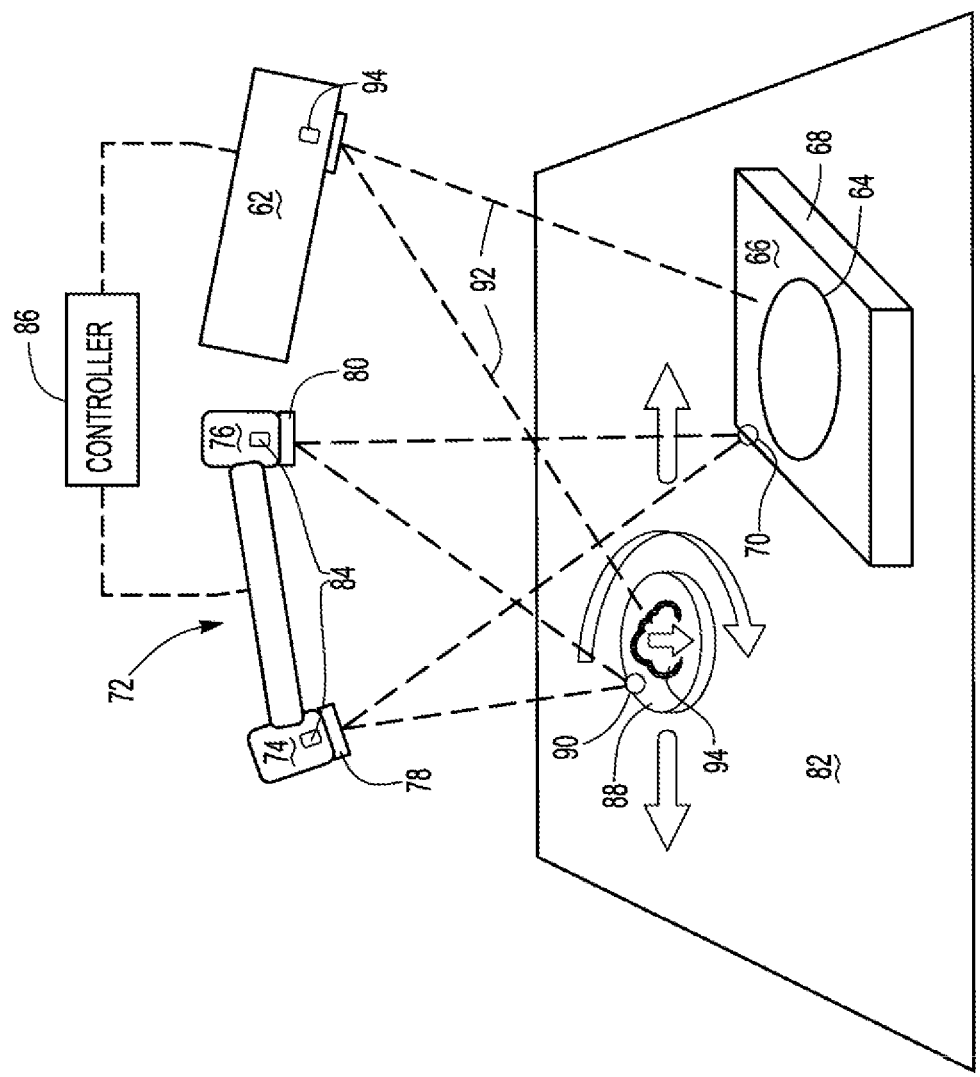
FIG. 5 shows first embodiment of a laser projection system of the present invention.
Figure 6:
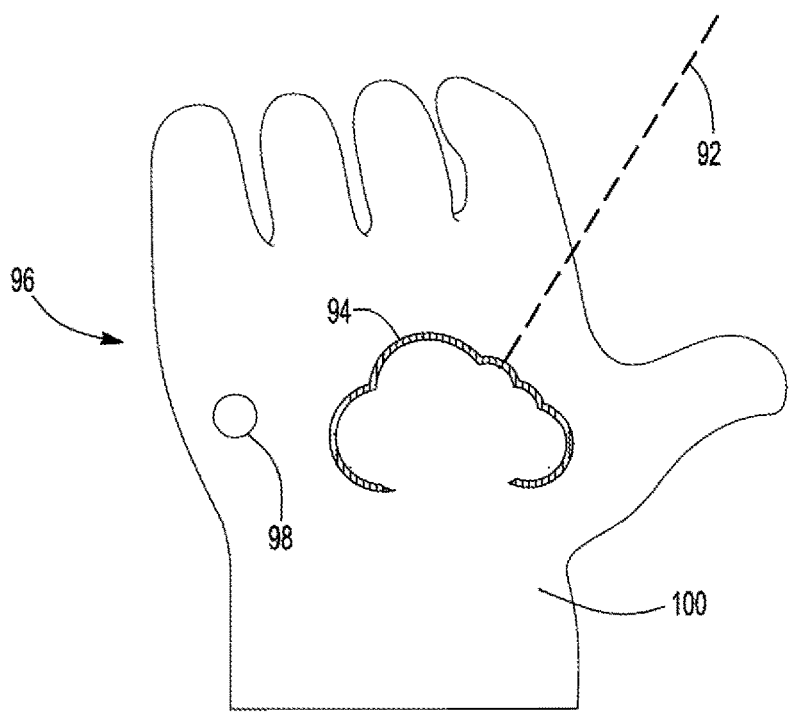
FIG. 6 shows an alternative embodiment of the control object.

Referring to FIG. 5, a first embodiment of a projection system of the present invention is generally shown at 60. The projection system 60 includes a projection device 62 for projecting a first optical image 64 onto a worksurface 66 of a workpiece 68 as will be explained further hereinbelow. In one embodiment, the projection device 62 takes the form of a laser projector as will be used throughout for simplicity. However, other light projection devices am within the scope of this invention. The laser projector 62 scans the first optical image 64 to direct a work function or assembly function to an operator. The first optical image 64 can take the form of a laser template to identify where an assembly task is to be performed such as, for example, a location at which a ply is to be mated to the worksurface 66. Alternatively, the first optical indicator 64 identifies a defect such as, for example, an identified surface imperfection on the worksurface by way of a scanned arrow or other icon configured to identify location of the defect. Still further, the first optical image 64 may provide assembly instructions to an operator such as, for example, identifying a component to be mated to the worksurface 64 based on predetermined assembly content.

A location of the laser projector 62 is registered in a common coordinate system relative to the worksurface 66 by scanning a worksurface marker 70 in a conventional manner. In one embodiment, the worksurface marker 70 is a retroreflective target located on a datum or other predetermined location of the workpiece 68 or worksurface 66 so that accurate projection of the first optical indicator 64 is achieved. Alternative marker are also included within the scope of this invention including, but not limited to, coded targets, spherical retroreflective targets, and combination markers.

A measurement device 72 takes the form of a photogrammetry system including a first camera 74 and a second camera 76. It should be understood to those of ordinary skill in the art that a photogrammetry system including a single camera is also within the scope of this invention. Each camera 74, 76 includes an illumination source 78, 80 used to illuminate a work area 82 in which the workpiece 68 is disposed. In one embodiment, the illumination source 78, 80 takes the form of an array of light emitting diodes that flash at predetermined or periodic intervals based upon desired illumination rates within the work area 82. Each camera 74, 76 includes a light sensor 84 such as, for example, a CCD or CMOS sensor that includes pixels for identifying reflected light originating from the illumination sources 78, 80 the purpose of which will be explained further hereinbelow.

The projection device 62 and the measurement device 72 are electronically connected via and controller 86. In one embodiment, the projection device 62 and the measurement device 72 are separate elements that are registered within a common coordinate system using techniques disclosed in U.S. Pat. No. 9,200,899, the contents of which are included herein by reference. Alternatively, the projection device 62 and the measurement device 72 are physically included within a single housing such as in the VPS1 laser projector sold by Virtek Vision International, Inc. and disclosed in U.S. Pat. No. 9,881,383, the contents of which are also included herein by reference. However, alternative measurement systems could also be used such as the iGPS system available from Nikon metrology combined with traditional laser projection systems or standard video projection systems as taught in U.S. Pat. No. 7,826,069, the contents of which are incorporated herein by reference. In either embodiment, it is desirable that a location of the projection device 62 relative to the measurement device 72 is determined to provide for accurate image projection.

A control object 88 is also disposed within the work area 82. A control marker 90 is affixed to the control object 88. The control marker 90 takes the form of a retroreflective target that functions in a known manner. In alternative embodiments, a plurality of control object 88 each including a control marker 90 are disposed within the work area 82. In some cases, it may be beneficial that one control marker is distinguishable from another control marker by way of encoding or the like.

In one embodiment, more than one projection devices 62 may be implemented to provide adequate coverage of large work areas 82. It should be understood that the projection system 60 by way of one or more laser projectors 62 is capable of projecting optical indicators 64 onto one or more worksurfaces 66. The optical indicator 64, as set forth above, may be an optical template pattern to guide placement of components on the worksurface 66 or take the form of a dot or similar indicator projected onto a bin to direct an operator where to select a next part when an assembly task is being coordinated. As alluded to above, the optical indicator 88 may also function to identify and highlight defects on the worksurface 66 as is disclosed in copending U.S. patent application Ser. No. 17/497,211, the contents of which are included herein by reference. It should also be appreciated that the optical indicator 64 may perform any number of alternative projection-related functions without varying the scope of this invention.

One or more control objects 88 maybe used to manipulate the optical indicator 66 and to direct the controller 86 to switch between a first optical indicator and a second optical indicator providing operator input between a first work function and a second work function respectively. The measurement system 72 tracks the relative positions of the worksurface 82 and the control object 88 by tracking the worksurface marker 70 and the control marker 90. The markers 70, 90 are chosen according to the measurement system 72 that may include retro reflective discs, electronic sensors, or other markings such as printed QR codes to distinguish between markers used with the system. The markers 70, 90 are disposed at predetermined locations of each of the work service 66 and the control object 88, such as, for example, datums.

The projection device 62 by way of a laser beam 92, or other light emission identifies the markers 70, 90 in a common coordination with the measurement system 72 to determine the position of the worksurface 66 and the control object 88 within a common three-dimensional coordinate system for use to accurately project the optical indicator 64. This is accomplished by reflection of the laser beam 92 to a laser sensor 94 in a known manner.

Photogrammetric measurement by way of the measurement device 72 works in combination with the markers 70, 90 allowing the optical indicator 64 to remain essentially stationary relative to the worksurface 66, even as the worksurface 66 is moved or manipulated. As such, the measurement device 72 provides motion compensation and real time adjustment for drift even when dynamic or unexpected movement of the worksurface 66 occurs.

As set forth above, the control object 88 is disposed within the work area 82 during operation. The control object 88 is passively tracked by the measurement device 72 without need of the projection device 62 to scan the laser beam 92 over the control marker 90. The use of the control object 88 is aided by an operator feedback display 94 that is dynamically projected by the projection device 62 onto a surface of the control object 88 when it is manipulated. While movement of the control object 88 by the operator is monitored by the measurement device 72, the projection device 62 dynamically projects the feedback display 94 onto the control object 88 either separately or in conjunction with the optical indicator 64 projected onto the worksurface 66 even while the control device 62 is moving.

In one embodiment, rotation of the control object 88 is used to select an operating mode, such as, for example file loading or progression through a sequence of optical indicators 64. The rotation, or other movement of the control object 88, is tracked by the measurement device 72 and signalled to the controller 72 for interpretation. Once interpreted, a current operating mode is indicated by the feedback display 94 projected onto the control object 88 that is a file icon projected by the projection device 62. Once the current operating mode is displayed on the control object 88 verifying to the operator which mode has been implemented, a scale of the feedback display 94 is temporarily modified to provide feedback to the operator that a selection has occurred in a similar manner as an exaggerated representation of pressing a button. when the appropriate operating mode is displayed on the control object 88, the control object 88 may be jogged left or right, or some other movement to signal progress through optical indicators 64 such as, for example, a first optical indicator and a second optical indicator, or the controlled jog object 88 may be lifted to indicate that a process step has been completed. These movements of the control object 88 are only made by way of example. Alternative movement maybe used to signal the controller 86 through the measurement device 72 initiation or completion of a work function. When the control object 88 is released and is once again stationary the feedback display 94 is no longer projected and the measurement system 72 returns to passively monitoring movement and position of the control object 88.

Although earlier embodiments illustrate one use of the control object 88 alternative implementations of the control object 88 and methods of manipulation or interaction between the control object 56 and the projection system 60 are also possible. For example, an alternative embodiment of the optical indicator system, i.e., the projection system 60 includes an alternative control object is generally shown at 96. In this embodiment, an alternate marker 98 is affixed to the back of a glove 100. The glove 100 is worn by an operator essentially converting the operator's hand into the alternate control object 96. By exposing the back of the glove 100 to the measurement device 72, the measurement device 72 begins tracking the glove 100 enabling the projection device 62 to project the feedback display 94 directly onto the glove 100. The operator can also wave the glove right or left to indicate inspection status of a defect location or completion of an assembly task as currently identified by the optical indicator 64. The operator may also lower the glove 100 to progress through to projecting a subsequent defect location for inspection or assembly step initiating a subsequent step that will be identified by projection of the next or subsequent optical indicator 64. Still further, partially covering the alternate marker 98 with, for example, a shirt sleeve, or by moving too abruptly for the measurement device 62 to follow the alternative marker 98 results in termination of the projection interaction between the projection system 60 and the operator.

Figure 7:
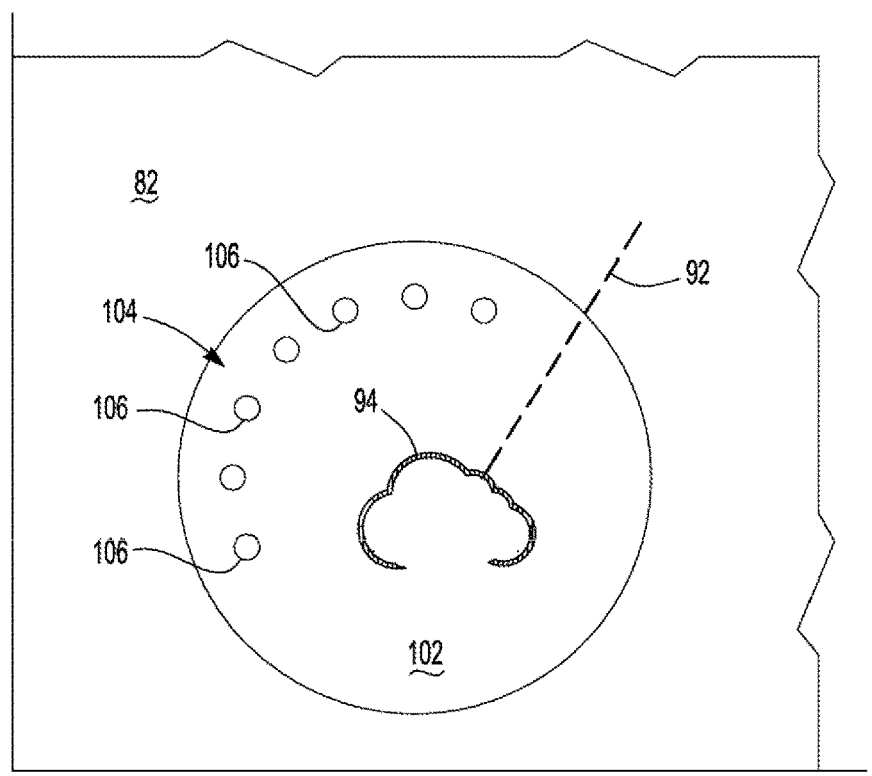
FIG. 7 a further alternative embodiment of the control object in the form of a glove.

In a further alternative embodiment of the control object is shown at 102 in FIG. 7. In this embodiment, the control object 102 is affixed in a stationary disposition within the work area 82. The alternate control object 102 includes an alternate marker 104 that defines a plurality of reflective spots 106 that are monitored by the measurement device 72. In this embodiment, the control object 102 signals the measurement device 72 disposition of a work function when an operator covers up one or more reflective spots 106. The projection device 62 scans a feedback display 94 on to the control object 102 as is described hereinabove. Thus, the control object 102 interfaces with the operator in a manner that is similar to a touch screen interaction with the controller 86. Affixing the control object 102 in a stationary position within the work area 82 in this manner prevents loss or misplacement of the control object 102.

In a still further embodiment, the projection system 60 of the present invention utilizes a workpiece as the control object 56. The workpiece includes a worksurface 66 such as, for example, a surface of a seat cushion or other objects that requires templated instructions for directing an operator through a sequence of assembly tasks. Thus, the workpiece onto which the optical indicator 64 is projected the workpiece functions as the control object. In a similar manner as described above, the worksurface 66 is passively monitored and tracked by the measurement device 72. The operator, after completing an assembly task, rotates, jogs, or lifts the workpiece 68 itself to select the operating mode, process through optical indicators, or indicate completion of various process steps.

It is also possible that the projection system 60 is trained to monitor assembly movements of the workpiece 68 during the assembly process as a queue or to indicate completion of various process or assembly steps. In this manner, an operator need not exhibit additional motion of the workpiece 68 to signal the controller 86 via the measurement device 72 status of an assembly process. Thus, the optical indicator system recognizes certain movements of the workpiece that indicate completion of a task. Upon completion, the projection device 62 projects a subsequent or second optical indicator it corresponding to a subsequent or second assembly task. For example, rotating or lifting the seat cushion after installing a first hook-and-loop fastener component onto the seat cushion would signal the measurement device 72 to project a subsequent template pattern corresponding to a second hook-and-loop faster component to be installed and the seat cushion. Therefore, utilizing a part or component as a control object 88 further increases efficiency related to controlling projection of an optical indicator 64.

Occasionally, the location of projection of the optical indicator 64 maybe need adjustment or alignment when projected onto the worksurface 66. The worksurface markers 70 can therefore be individually manipulated on the worksurface 66 to adjust and fasten the optical indicator 70 into accurate alignment within the worksurface 66. If the measurement device 72 detects manipulation of the worksurface marker 70, the projection device 62 automatically projects an alignment template pattern configured to help identify important features of the worksurface 66 to aid an operator in manual alignment of the worksurface marker 70. It should therefore be understood that the alignment template pattern 64 then moves simultaneously with the worksurface markers 70 allowing the operator to properly place the worksurface marker 70 on the worksurface 66 to effectively calibrate the projection device 62 in the common coordinate system with the workpiece 68.

Other variations of properly aligning or adjusting the optical indicator 64 on the worksurface 66 are also possible without varying the scope of the invention. For example, the projection device 62 can first project the alignment template pattern onto a predetermined location in the work area 82 and onto the worksurface 66. From these projections, manual alignment of the workpiece 68 his achieved followed by manual alignment of the worksurface marker 70 subsequently placed to match alignment of the template pattern 64. Alternatively, the worksurface marker 70 can first be placed on the worksurface 66 and moved by manual manipulation to match the alignment template pattern that is projected by the projection device 62 based on original placement of the marker 70 or markers 70.

The invention of the present application provides unique ability for operators to be provided real time feedback at remote locations to a controller of accurate tracking of a sequence of manufacturing events. In the example of the glove 100 functioning as the control object 96, the measurement device 72 tracks the glove 100 to, for example, a paint defect by proximate identification with an index finger. The laser projector 62, in this embodiment, identifies a target object along the path of where the operator is pointing but currently out of reach from the operator, such as a paint defect or other object that was initially missed by the automated inspection. Once the glove 100, or more specifically the alternate control marker 98 is detected, feedback is provided to the operator by projection of the feedback display 94 on the back of the glove 100. In one embodiment, a defect ID or assembly status is projected as the feedback display 94. Once a task is completed, the operator need merely wave his or her hand to change status at the controller 86 via detection by the measurement device 72 of the hand movement. It is also possible that the feedback display 94 be projected onto the worksurface 66 indicating status of a task. Status of all required and completed tasks are tracked way of the controller or via cloud storage and files are updated to automatically provide for electronic monitoring of a sequence of required task. When the full sequence is complete, a feedback display 94 indicating completion is projected either on the control object 88, 90, 104 or worksurface 66 as desired.

The laser projector 62 is capable of simultaneously transmitting multiple optical indicators 64 and feedback displays 94. For example, crosshairs may be projected onto a worksurface 66 identifying locations at which weld studs are required. A first operator marks the crosshair locations with a center punch. A second operator installs the weld studs at the marked locations. Any number of operators work simultaneously all coordinated by the sequence of projected feedback displays 94 as are triggered by the operator manipulating the control object 88, 96, 104.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A method of controlling projection of optical indicators on a worksurface, the method comprising:
    providing a projection device for projecting a first optical indicator and a second optical indicator onto a worksurface, and providing a measurement system for monitoring a work area including said worksurface being disposed therein;
    said measurement system locating a control object within the work area and identifying a marker disposed on said control object;
    said measurement system monitoring a first disposition and a second disposition of said control object;
    said projection device projecting the first optical indicator onto the worksurface; and
    said projection device projecting the second optical indicator onto the worksurface in response to manipulation of said control object between the first disposition and the second disposition as detected by said measurement system.

2. The method set forth in claim 1, wherein said step of providing a projection device is further defined by providing a laser projector.

3. The method set forth in claim 1, wherein said step of providing a measurement system is further defined by providing a photogrammetric device comprising a camera.

4. The method set forth in claim 1, wherein said step of projecting the second optical indicator in response to manipulation of said control object is further defined by physically moving said control object.

5. The method set forth in claim 1, wherein said step of projecting the second optical indicator in response to manipulation of said control object is further defined by partially occluding said control object.

6. The method set forth in claim 1, further including a step of altering the first and second optical indicators by altering a disposition of said markers.

7. The method set forth in claim 1, further including a step of said projection device projecting a feedback display onto said control object.

8. The method set forth in claim 1, wherein said step of locating a control object within the work area is further defined by identifying an object containing the worksurface as said control object.

9. The method set forth in claim 7, wherein said step of projecting a feedback display on a surface of said control object is further defined by said projection device following movement of said control object such that said feedback display is projected essentially stable relative to said control object.

10. The method set forth in claim 7, further including a step of modifying said feedback display in response to manipulation of said control object to indicate changes in the first and second optical indicators.

11. The method set forth in claim 1, wherein said control object comprises a reflector adhered to a work glove.

12. A projection system for projecting and controlling optical indicators on a worksurface, the projection system comprising:
   a projection device for projecting a first optical indicator and a second optical indicator onto a worksurface;
   a control object identified by a marker disposed on said control object;
   a measurement system for monitoring a first disposition and a second disposition of said control object;
   a controller for storing the first optical indicator and the second optical indicator and for communicating with said projection device and said measurement system; and
   wherein said measurement system detects manipulation of said control object between the first disposition and the second disposition and communicates with said controller such that said projection device cycles between projecting the first optical indicator and the second optical indicator onto the worksurface.

13. The system set forth in claim 12, wherein said projection device comprises a laser projector.

14. The system set forth in claim 12, wherein said measurement system comprise a photogrammetry device.

15. The system set forth in claim 14, wherein said photogrammetry device comprises a camera including a pixelated light sensor.

16. The system set forth in claim 12, wherein said control object comprises at least one of a glove, a tool, or a handheld object.

17. The system set forth in claim 16, wherein said control object includes a control marker comprising a retro-reflective tape.

18. The system set forth in claim 12, wherein said measurement device includes a light illumination source for illuminating said work area.

19. The system set forth in claim 18, wherein said measurement system detects light generated by the illumination source being reflected from said control marker.

20. The system set forth in claim 19, wherein said measurement device detect movement of said control mark from light reflected from said control marker to a camera defining said measurement device and said measurement device signals said controller such movement for said controller to monitor initiation and completion of a manufacturing task.

21. The system set forth in claim 12, wherein said projection device is configured to project a feedback display onto said control object in response to movement of said control device.

22. The system set forth in claim 21, wherein said measurement device tracks movement of said control object and via said controller signals said projection device a location of said control object thereby enabling said projection device to continuously project the feedback display onto said control object.

* * * * *